United States Patent [19]

Shikama et al.

[11] Patent Number: 4,797,545
[45] Date of Patent: Jan. 10, 1989

[54] OPTICAL HEAD DEVICE HAVING POSITIONALLY ADJUSTABLE PARTS

[75] Inventors: Shinsuke Shikama; Mitsushige Kondo; Eiichi Toide, all of Kyoto, Japan

[73] Assignee: Mitsubishi Denki Kabushiki Kaisha, Tokyo, Japan

[21] Appl. No.: 52,860

[22] PCT Filed: Aug. 14, 1986

[86] PCT No.: PCT/JP86/00416
§ 371 Date: Apr. 29, 1987
§ 102(e) Date: Apr. 29, 1987

[87] PCT Pub. No.: WO87/01466
PCT Pub. Date: Mar. 12, 1987

[30] Foreign Application Priority Data

Sep. 10, 1985 [JP] Japan ................... 60-200163

[51] Int. Cl.$^4$ .............................. G01J 1/20
[52] U.S. Cl. ......................... 250/201; 369/44
[58] Field of Search ............ 250/201 DF, 201 AF, 250/201 R, 216; 369/44, 45, 46

[56] References Cited

U.S. PATENT DOCUMENTS

| | | | |
|---|---|---|---|
| 3,932,700 | 1/1976 | Snopko | 250/201 DF |
| 4,128,847 | 12/1978 | Roullet et al. | 250/201 DF |
| 4,302,830 | 11/1981 | Hamaoka et al. | 369/45 |
| 4,354,103 | 10/1982 | Immink et al. | 250/201 DF |
| 4,458,144 | 7/1984 | Reilly et al. | 369/45 |

Primary Examiner—David C. Nelms
Assistant Examiner—William L. Oen
Attorney, Agent, or Firm—Staas & Halsey

[57] ABSTRACT

In an optical head device, the distance between a light source, such as a semiconductor laser, and a condensing lens is altered along the optical axis thereof, so that the resulting spherical aberration may offset any component of spherical aberration that exists in an optical system as an inherent defect, whereby the wave-front aberration of the beam concentrated through the condensing lens is reduced. The device, therefore, includes an optical condensing system of improved aberration and condensation property.

12 Claims, 5 Drawing Sheets

OPTICAL HEAD DEVICE HAVING POSITIONALLY ADJUSTABLE PARTS

BACKGROUND OF THE INVENTION

1. Field of the Invention

This invention relates generally to an optical head device for recording information in an optical information recording medium and reproducing or erasing it therefrom, and more particularly, to an optical head device including an optical system which is free from any spherical aberration and can satisfactorily concentrate light.

2. Description of the Related Art

There has recently been a great deal of activity for realizing an optical head device for recording information in an optical disk and reproducing it therefrom by utilizing an optical system of maximum diffraction which is substantially free from any abberation.

The essential construction of such an optical head device is shown in FIGS. 7(a) to 7(c).

The device includes a semiconductor laser (LD) 1 defining a source of light, a condensing lens 2, a disk 3 having an information recording surface 4 provided with an information track 12, a beam splitter 10, a diffraction grating 14 and a cylindrical lens 15. A beam 7 of light leaving the LD 1 at a point 6 is concentrated by the lens 2 on the disk 3 at a point 5. The beam is also concentrated on a light detector 11 at a point 13.

Referring to the operation of the device, a diverging beam 7 of light is emitted by the LD 1 at the point 6 and converted by the condensing lens 2 to a converging beam. The converging beam passes through a transparent substrate forming the disk 3 and having a thickness d and is concentrated on the information recording surface 4 at the point 5.

The beam which has been reflected by the information recording surface 4 passes through the condensing lens 2, is separated from the beam 7 by the beam splitter 10 and is received by the light detector 11 whereby a light signal is produced.

The device has focus and tracking servo functions to ensure that the point 5 on the disk 3 on which the beam is concentrated by the condensing lens 2 is always located in an information track 12.

The focus and tracking functions of the device shown in FIGS. 7(a) to 7(c) are carried out by an astigmatic method and a twin spot method as will now be described briefly.

Referring first to the astigmatic method, an astigmatic device, such as the cylindrical lens 15, is provided in the path of the reflected beam for rendering it astigmatic. The position of the light detector 11 along the optical axis is adjusted to ensure that the beam radiated on the light detector 11 forms a minimum circle 13 of aberration if the focal point 5 is correctly positioned in the information track 12. The light detector comprises four detector elements 11a to 11d, as shown in FIG. 7(b).

If the optical disk 3 is displaced along the optical axis, the spots on the light detector 11 change their shape from a minimum circle of abberation as shown at 13 by a solid line to an elongated oval shape as shown by broken lines. This change is detected as an electrical focus error signal which is obtained by the calculation of a differential between the total output of one of the two pairs of diagonally disposed detector elements and the total output of the other pair, i.e., $(11a+11c)-(11b+11d)$. This signal causes a focus actuator (not shown) to move the condensing lens 2 to correct any deviation of the focal point 5 from the information recording surface 4 along the optical axis.

According to the twin spot method, the beam 7 of the LD 1 is divided by the diffraction grating 14 disposed across its path into a plurality of beams, i.e., of the zero- and ±1-orders and is concentrated on the information track 12 as shown in FIG. 7(c). The beam of the zero-order is correctly radiated on the center of the information track and is used for signal reading and recording purposes. The beams of the ±1-order are slightly deviated from the track. The three spots lie in a line which is slightly inclined to the information track 12.

The diffracted beams of the ±1-order rays are received by the light detectors 11e and 11f and their difference $(11e-11f)$ provides a tracking error signal which causes a tracking actuator not shown to move the condensing lens 2 to correct any deviation of the focal point 5 from the information track 12 in the plane of the information recording surface.

The optical head device as hereinabove described has a bit length and a track spacing which are so small as to enable the reading of any signal when the condensing system between the LD 1 and the condensing lens 2 is at a diffraction limit, so that the recording medium may be able to store a large amount of information at a high density.

Therefore, the converging beam which is incident to the information recording surface 4 must be free from any aberration so that the condensed spot 5 formed by the system at the diffraction limit may be radiated on the information track 12. The wave-front aberration which is permissible as the diffraction limit has a standard diviation of 0.07 λ (Marechal limit), where, λ is the wavelength of the LD.

It is known that when light is concentrated through a disk composed of a transparent substrate having a thickness d as hereinabove described, a wave-front aberration of formula (1) occurs as a spherical aberration of the fourth order:

$$W_{40} = \frac{d}{8} \cdot \frac{N^2 - 1}{N^3} \sin^4\theta_2 \tag{1}$$

The concentration of light with substantially no aberration is required for an optical disk head. When the condensing lens 2 is designed, therefore, its spherical aberration is left without complete correction so that a balance may be obtained when its aberration $W_{40}$ is offset by the aberration resulting from the passage of a beam through the substrate of the disk.

FIG. 8 is a view showing the optical condensing system in the optical head device of FIG. 7(a). In FIG. 8, $l_1$ and $l_2$ are the distance between the principal surface H of the condensing lens and the light emitting point 6 of the light source, and the distance between the principal surface H' of the lens and the light concentrating point 5 on the disk 3, respectively. When the optical head is designed, the distances $l_1$ and $l_2$ are selected to position the light emitting point 6 and the light concentrating point 5 in a conjugate relation with respect to paraxial rays.

In other words, the distances have the following relation to the focal length $f_0$ of the condensing lens 2:

$$\frac{1}{l_1} + \frac{1}{l_2} = \frac{1}{f_0} \quad (2)$$

The parameters (e.g., shape and thickness) of the condensing lens 2 are selected as minimize any disorder in the wave front of the beam to be concentrated, or any wave-front aberration when the positional relation satisfying formula (2) exists.

The optical head device which has hereinabove been described, however, include various factors that give rise to wave-front aberration and thereby lower its recording and reproducing performance. Spherical aberration, which is one of the components of wave-front aberration, will hereinafter be discussed.

Spherical aberration is due to (1) an error in thickness of the disk, (2) variation in the refractive index of the disk, (3) deviation of the shape of the refracting surface of the condensing lens from a designed one, (4) error in thickness of the condensing lens, (5) variation in the refrative index of the condensing lens, etc.

For example, if the disk comprises a polycarbonate substrate having a refractive index N of 1.55 and if the condensing lens has a numerical aperture (NA) expressed as $\sin\theta_2=0.5$, formula (1) gives the rms wave-front aberration of 0.014 $\lambda$ for light having a wavelength of 0.78 $\mu$m if the disk has an error of 50 $\mu$m in thickness. This amounts to 20% of the allowable rms wave-front aberration of 0.07 $\lambda$ which has hereinabove been stated, though the error in thickness of the disk is very small.

All of the other factors stated at (2) through (5) above also give rise to the fourth-order spherical aberration which is symmetric with respect to the optical axis. The superposition of each factor also gives rise to the component of aberration which is symmetric with respect to the optical axis and as a result causes the fourth-order spherical aberration to remain. The wave-front aberration can be expressed as $W_{40} \cdot \rho_4$, where $\rho$ is the normalized radius of the pupil which is greater than 0 and less than 1.

It is well known that the presence of any such spherical aberration results in a lower central intensity of the light concentrating point (spot) 5 and thereby a larger diameter thereof. The increase in diameter of the light concentrating point 5 leads to a reduction in OTF of the optical system resulting in a reduction in the recording and reproducing density of the optical disk head and its performance.

SUMMARY OF THE INVENTION

Under these circumstances, it is an object of this invention to provide an optical head device in which spherical aberration is minimized by a very simple positional adjustment of parts.

According to the optical head device of this invention, the distance between the LD and the condensing lens is altered along the optical axis so that a balance is reached between the spherical aberration resulting from such alteration and the original spherical aberration of the optical system to reduce the wave-front aberration of a condensed beam and thereby improve the condensing ability of the condensing system.

It is another object of this invention to provide an optical head device including a system which can condense light without any aberration at a diffraction limit, while maintaining the focus and tracking sensor characteristics as designed. This object is attained by a device comprising a unit in which a source of light, a beam splitter and a light detector are spaced apart from one another by a fixed distance relative to one another, and which is movable along the optical axis of a condensing lens so that it is possible to correct the spherical aberration of the optical condensing system without moving the light concentration spot on the light detector.

DETAILED DESCRIPTION OF THE PREFERRED EMBODIMENTS

Figure 1:
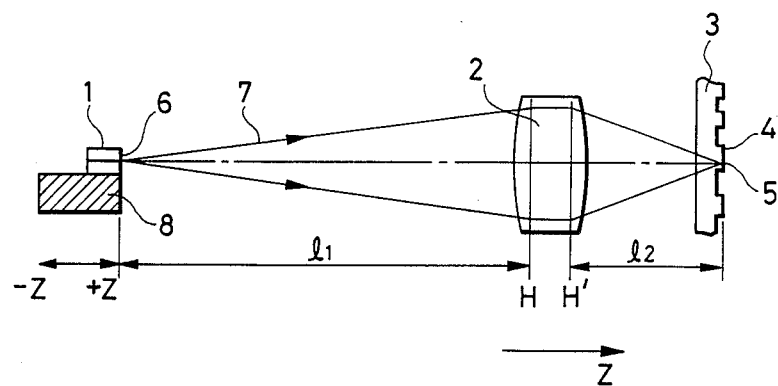
FIG. 1 is a diagrammatic view of an optical head device according to a first embodiment of the present invention.

A first embodiment of this invention is shown in FIG. 1. Like numerals and symbols are used to indicate like parts both in FIG. 1 and in FIGS. 7(a) to 7(c) and 8. FIG. 1 further shows means 8 for adjusting the position of the LD 1 in either of two directions shown by arrows $+Z$ and $-Z$ along its optical axis.

The adjusting means 8 can move the LD 1 along its optical axis from its normal position in which it is spaced apart by the normal distance $l_1$ from the condensing lens 2 which comprises an objective lens of the finite conjugate type. The parameters of the condensing lens 2 are so selected as to give the best results when the first and second principal surfaces H and H' of the lens 2 are spaced apart from the LD 1 and the information recording surface of the disk 3, respectively, by the distances $l_1$ and $l_2$, respectively.

Therefore, if the position of the LD 1 is altered to change its distance from the first principal surface H from $l_1$ to $l_1+\Delta$, spherical aberration occurs, as the optimum positional relationship ceases to exist.

Figure 3A:
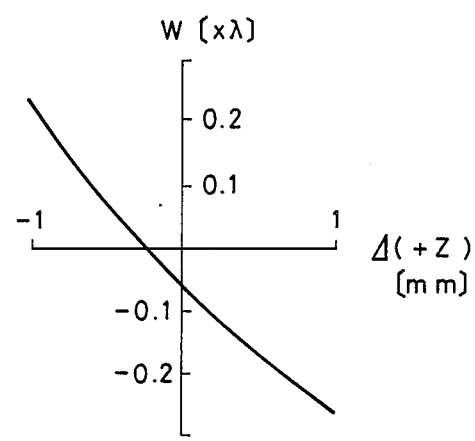
FIGS. 3(a) to 3(c) are graphs showing the analysis of aberration resulting from the movement of a LD.
Figure 3B:
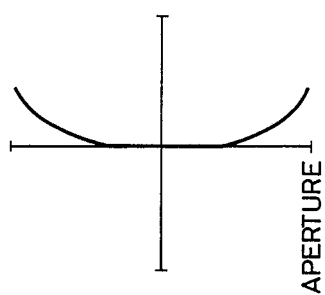
Figure 3C:
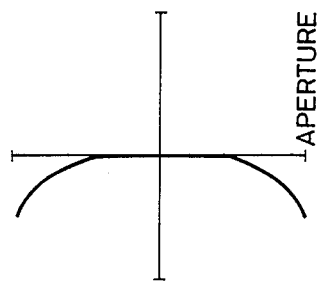

FIG. 3(a) is a graph showing by way of example the results of calculation of the spherical aberration of a particular condensing lens in relation to the amount $\Delta$ by which the distance $l_1$ is changed. FIGS. 3(b) and 3(c) are graphs showing the aberration when $\Delta$ is $-1$ mm and $+1$ mm, respectively.

If the LD 1 is moved away from, or toward, the condensing lens 2, the lens produces the positive or negative spherical aberration as shown in FIGS. 3(b) and 3(c). The spherical aberration which is thus produced offsets any spherical aberration that may originally exist in the optical system due to any of the defects as hereinbefore stated. In the specific case as hereinabove stated, the movement of the LD 1 by $\pm 1$ mm enables the control of the spherical aberration by as much as about $\pm \lambda/4$.

Figure 2:
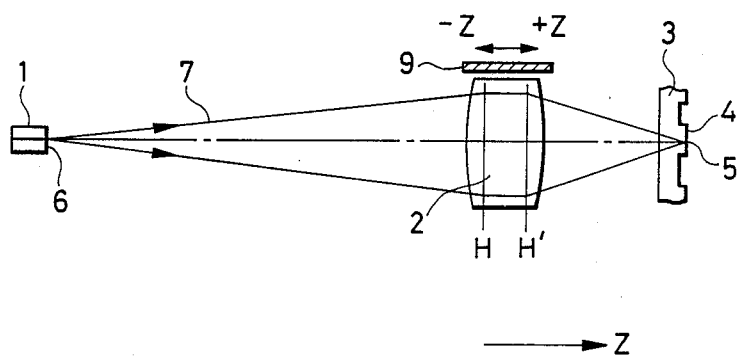
FIG. 2 is a diagrammatic view of a device according to a second embodiment of this invention.

A second embodiment of this invention is shown in FIG. 2. It includes means 9 for adjusting the position of the condensing lens 2 along its optical axis. The distance between the LD 1 and the condensing lens 2 is altered by the movement of the lens, as opposed to the first embodiment. The second embodiment is, however, equally effective for reducing the wave-front aberration which may give rise to spherical aberration, as it equally relies upon the alteration of the distance between the LD and the condensing lens.

The adjusting means 8 and 9 do not necessarily need to be continuously movable, but it is also effective to employ a plurality of mounts which can be selectively used for changing the position of the LD relative to the condensing lens to place them approximately in the positions where the wave-front aberration is reduced to a minimum. The correction of aberration by the device of this invention is not necessarily limited to the optical condensing system for an optical disk head, but is equally applicable to the correction of spherical aberration in any other optical system that is required to show any optical performance close to a diffraction limit.

According to the embodiments of this invention which are shown in FIGS. 1 and 2, the means for adjusting the distance between the LD and the condensing lens can drastically reduce the wave-front aberration which is due to the spherical aberration of the optical condensing system and can very effectively maintain the performance of the condensing system within its diffraction limit. Therefore, it is possible to reduce the diameter of the light concentrating point and thereby improve the OTF of the optical system to improve greatly any reduction in the recording and reproducing properties of the optical head that is due to spherical aberration, and increase the allowable spherical aberration thereof.

Figure 4:
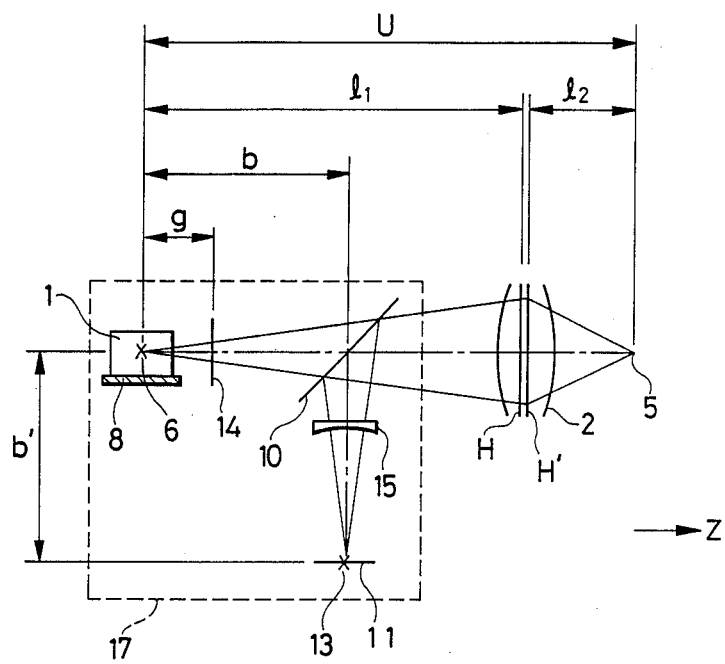
FIG. 4 is a diagrammatic view of a device according to a third embodiment of this invention.

The two embodiments which have been described have, however, been found to involve the problems which will now be explained with reference to FIG. 4. FIG. 4 shows the optical head device according to the first embodiment of this invention which has been described with reference to FIG. 1. Like numerals and symbols are used to indicate like or similar parts in both of FIGS. 1 and 4.

In FIG. 4, U is the distance between the light emitting point 6 of the LD 1 and the light concentrating point 5 on the optical disk, which are conjugate points, b is the distance between the point 6 and the beam splitter 10, g is the distance between the point 6 and the diffraction grating 14, and b' is the distance between the beam splitter 10 and the light concentrating point 13 on the light detector 11, which is another conjugate point.

If for correcting spherical aberration, the adjusting means 8 is used to move the LD 1 in the direction Z along its optical axis to alter its distance from the objective lens 2 by $\Delta$ from $l_1$ to $l_1 + \Delta$, its distance from the beam splitter is also altered to $b + \Delta$.

Therefore, the position of the conjugate point 13 and thereby the distance b' are also altered.

As a result, it is necessary to move the light detector 11 or an adjusting lens provided, for example, in the position of the cylindrical lens 15, though not shown, in order to ensure that a minimum circle of aberration be radiated on the light detector 11 at the point 13.

In addition to the wide range of adjustment which is required as hereinabove stated, a variation in astigmatism results from the varying position of concentration of the reflected beam which is incident to the cylindrical lens 15. It presents the serious problem that the focus sensor performance may differ from a designed one. The distance g between the light emitting point 6 of the light source and the diffraction grating 14 is also altered by $\Delta$.

Figure 7A:
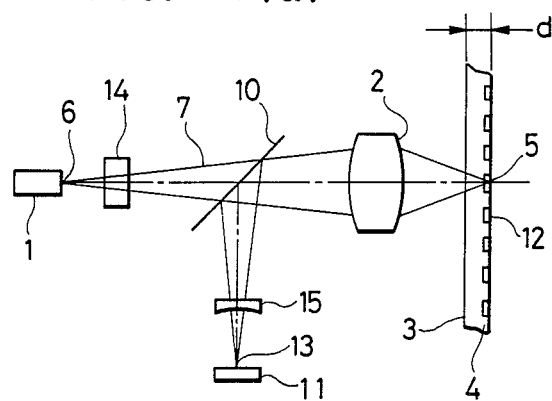
FIGS. 7(a) to 7(c) are diagrammatic views of a conventionally known optical head device.
Figure 7B:
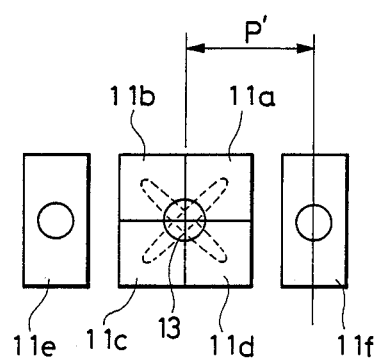
Figure 7C:
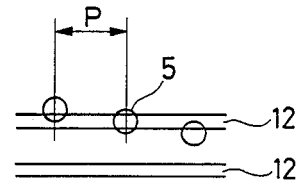
Figure 8:
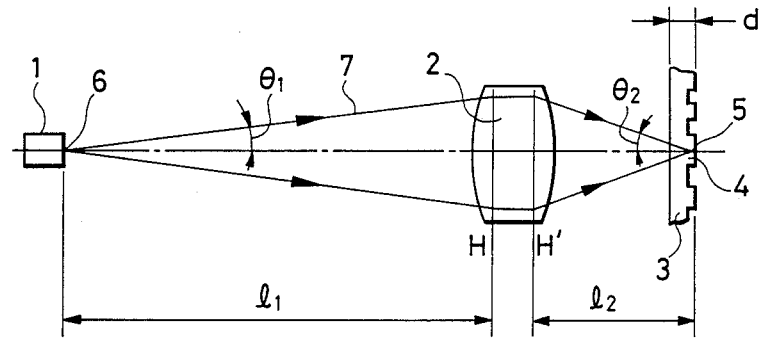
FIG. 8 is a diagrammatic view of the optical condensing system in the conventionally known optical head device.

The pitch P between the spots in FIG. 7(c) varies in proportion to $\Delta$ and the pitch P' between the spots on the light detector in FIG. 7(b) also varies substantially in proportion to $\Delta$. It is, therefore, likely that no light may be radiated on the appropriately positioned light detector 11e or 11f. Moreover, if P' decreases, an interference with light of the zero order is likely to affect adversely both of the focus and tracking sensor performances of the device.

Attention is now drawn to the problems of the optical head device according to the second embodiment of this invention.

If the condensing lens 2 is moved so that the distance $l_1$ may be altered to $l_1 + \Delta$, the distance $l_2$ between the lens 2 and the disk is also altered in accordance with formula (2). Therefore, it is necessary to move the optical disk 3 along the optical axis in order to ensure that the light concentrating point 5 is formed in the information recording surface 4. The movement of the disk practically undesirably requires a complicated mechanism to be added when the optical head device is mounted in a player.

The problems as hereinabove pointed out of the optical head device according to the first embodiment are due to the fact that only the LD 1 is movable. If the position of the optical head device as a whole is adjusted relative to the disk, the problems are likely to be solved, as the distances b and g (FIG. 4) remain unchanged.

According to the first embodiment, the distance $l_1$ is varied to control spherical aberration. The variation of the distance $l_1$ naturally results in a variation of the distance U between the light emitting point 6 and the light concentrating point 5 on the optical disk, i.e., the conjugate points.

Figure 5A:
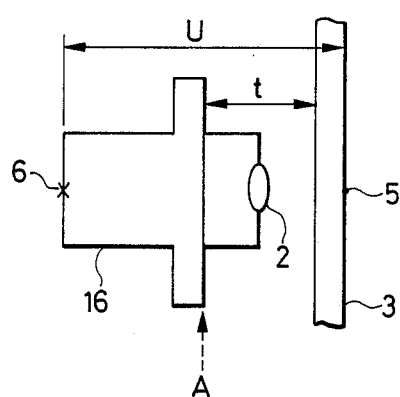
FIGS. 5(a) and 5(b) are diagrammatic views showing the mounting adjustment of the optical head device.
Figure 5B:
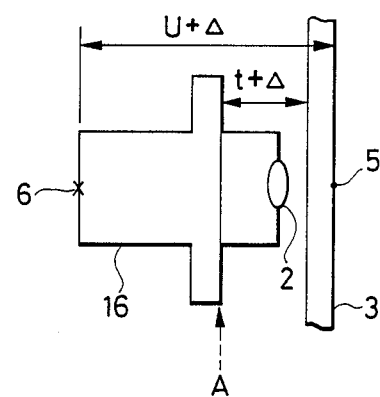

Therefore, another embodiment of the device for correcting spherical aberration is shown in FIGS. 5(a) and 5(b).

In FIG. 5(a), U is the distance between the light emitting point 6 of the light source and the light concentrating point 5 on the optical disk. A indicates a reference plane for the mounting of the optical head device 16 and t is the distance between the reference plane A and the optical disk 3.

FIG. 5(a) shows the optical head device 16 in its original position in which it stays prior to the correction of spherical aberration and FIG. 5(b) shows the position of the device 16 to which it is brought when it is moved by $\Delta$ in the Z direction.

In FIG. 5(b), the distance between the light emitting point 6 of the light source and the light concentrating point 5 on the disk is now $U + \Delta$ and the movement of the whole device by the small distance $\Delta$ enables the correction of its spherical aberration.

In the device shown in FIGS. 5(a) and 5(b), however, the distance t between the reference plane A and the optical disk 3 is also altered to $t + \Delta$. Therefore, it is necessary to add a mechanism for changing the mounting height of the optical head device 16 when mounting it in a player. This mechanism undesirably presents a problem concerning the space in which the other parts of the player are installed.

These problems can be overcome by another or third embodiment of this invention. An optical head device includes means for adjusting the distance between the light source and the objective lens and thereby realizes an aberration-free optical condensing system, while maintaining the designed focus and tracking sensor characteristics, as will hereinafter be described in detail.

The third embodiment will be described with reference to FIG. 4 except the adjusting means 8 which it does not include. No description will be made of its focus or tracking servo system or its principle of spherical aberration correction, as they duplicate those which have hereinbefore been described.

According to the third embodiment, the distances g, b and b' are all fixed and the correction of spherical aberration is carried out by the adjusting means 17 which moves the LD 1, the diffraction grating 14, the beam splitter 10, the cylindrical lens 15 and the light detector 11 as a whole along the optical axis (i.e., in the Z direction) and thereby adjusts the distance $l_1$.

As the distance b between the LD 1 and the beam splitter remains unchanged, the distance b' between the light concentrating point 13 receiving the reflected light from the optical disk, which is in a conjugate relation to the light emitting point 6 of the LD 1, and the beam splitter also remains unchanged. Therefore, the light concentrating point 13 stays on the light detector 11.

As naturally no variatioon occurs due to astigmatism, the focus sensor characteristics hardly differ from their standard or designed level. As the distance g between the LD 1 and the diffraction grating 14 also remains unchanged, no change occurs to the pitch P' between the spots in FIG. 7(b). Both of the focus and tracking servo characteristics can be maintained at a satisfactory level without any variation.

Injection or press molded lenses, such as molded plastic lenses, press molded glass lenses, grating lenses and Fresnel lenses, have recently been invented for use as low-priced and lightweight objective lenses. They are presently in practical use. While these lenses are easy to manufacture in large quantities, aberration is likely to result from any error during the molding operation or in the design of the mold cavity. It is, however, known that the lenses which are manufactured in a single lot have a relatively uniform degree of aberration with a relatively small variation. According to a fourth embodiment of this invention, therefore, a multiplicity of lenses belonging to a particular molding lot are examined with respect to their wave-front aberration, e.g., their average spherical aberration and several housing defining different distances $l_1$ are selectively employed instead of the spherical aberration correcting means 17 which is required by every optical head device according to the third embodiment. One of the housing is used with any of the lenses belonging to the same lot to offset or correct their average spherical aberration. This arrangement makes it possible to correct the spherical aberration of any lens considerably effectively.

Figure 6A:
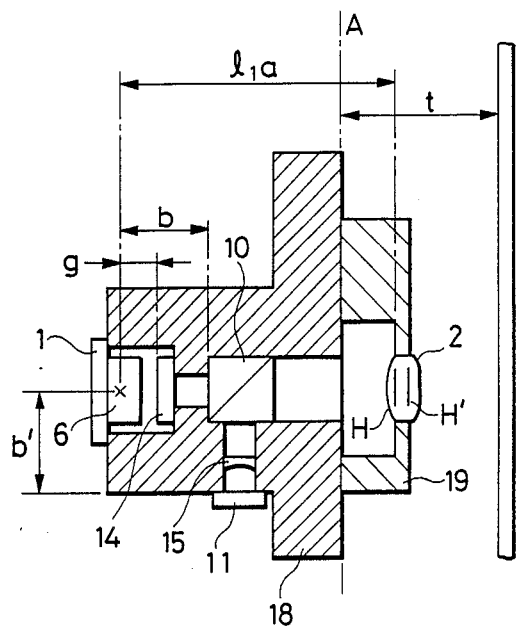
FIGS. 6(a) and 6(b) are sectional views showing in detail the internal construction of the device embodying this invention.

The fourth embodiment will be described in further detail with reference to FIGS. 6(a) and 6(b). The housing is shown at 18 and a focus and tracking actuator at 19. In FIG. 6(a), the light emitting point 6 of the LD 1 and the principal surface H of the condensing lens 2 have a distance $l_{1a}$ therebetween. The optical head device of FIG. 6(b) includes a housing 18 which defines a different distance $l_{1b}$ therebetween. The distances g, b and b' are all equal in both of FIGS. 6(a) and 6(b).

Figure 6B:
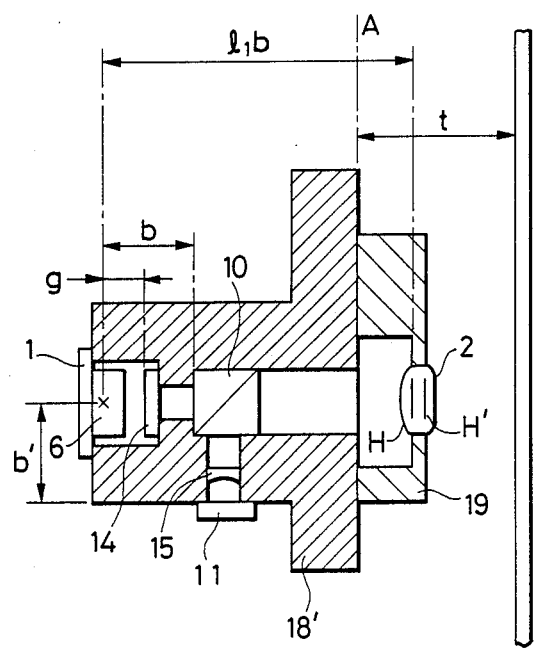

The reference plane A for the mounting of the optical head device is at an equal distance t from the optical disk in both of FIGS. 6(a) and 6(b).

If it is statistically certain that a multiplicity of objective lenses belonging to a particular lot have a particular degree of spherical aberration, all of the lenses can be mounted on the housing 18 defining the distance $l_{1a}$ as shown in FIG. 6(a) if it can correct their spherical aberration more effectively than the housing 18' shown in FIG. 6(b). Therefore, it is possible to correct the spherical aberration of any such lens if several housings 18 defining slightly different distances $l_1$ are selectively used. The device is less expensive, since it does not require any adjusting means of the type which is employed in the device according to the first embodiment. The device is as effective as that according to the first embodiment, since it satisfies the essential requirements of this invention that the distances b, g and b' remain unchanged. The optical head device according to the third embodiment has the advantage that when it is used with a player, no change is required of its mounting position or the position in which the disk is mounted, since the distance t between the mounting plane A and the disk is kept unchanged. Although the embodiments have been described as employing an astigmatic focus servo system and a twin-spot tracking servo system, it is also possible to employ a Foucault, knife-edge, critical angle, heterodyne or push-pull or any other servo system. In any event, the objects of this invention can be attained if the distance between the light source and the objective lens is altered without calling for any change in the relative positions of the light source, beam splitter and light detector in an optical system of the type in which the reflected beam for the sensor and the beam emitted by the light source are separated from each other by the beam splitter.

As is obvious from the foregoing, this invention enables the realization of a device which can correct the spherical aberration of its optical condensing system and condense light at its diffraction limit, while maintaining its focus and tracking performances, since the position of the light source, beam splitter and light detector as a whole can be altered relative to the condensing lens along its optical axis, while their own positions relative to one another are kept unchanged.

This invention is applicable to an optical head which is used for an optical disk, compact disk, etc.

We claim:

1. An optical head device including a semiconductor laser and a finite conjugate type condensing lens for concentrating a beam of light which is emitted by said laser, the device comprising:
   altering means for altering the distance between said lens and said laser along the optical axis thereof to reduce the spherical aberration of said beam concentrated through said lens.

2. An optical head device as set forth in claim 1, wherein said altering means comprises means for moving said laser along said optical axis.

3. An optical head device as set forth in claim 1, wherein said altering means comprises means for moving said lens along said optical axis.

4. An optical head device including a light source, a finite conjugate type optical condenser through which a beam of light emitted by said light source is concentrated on an information recording medium, a beam splitting element for separating the beam reflected by said information recording medium from said emitted beam and a light detector for receiving said reflected beam, the device comprising:

a first group of optical elements including said light source, said beam splitting element and said light detector;

a second group of optical elements including said finite conjugate type optical condenser, said elements of said first group having a fixed positional relationship to one another; and means for adjusting the distance between said first and second groups along the optical axis thereof to correct the spherical aberration of said beam concentrated on said information recording medium.

5. An optical head device as set forth in claim 4, wherein said adjusting means comprises means for moving said first group along said optical axis.

6. An optical head device as set forth in claim 4, further including a housing on which said optical elements belonging to said first and second groups are mounted, said housing being selected from among a plurality of housings designed for defining gradually differing distances between said first and second groups, said selected housing being one which reduces said spherical aberration to a greater extent than any other housing.

7. An optical head device as set forth in claim 4, wherein said first group further includes a diffraction grating.

8. An optical head device as set forth in claim 4, wherein said condenser comprises an objective lens of the finite conjugate type.

9. An optical head device as set forth in claim 1, wherein said altering means is separate from a focus actuator and is independently controlled.

10. An optical head device as set forth in claim 4, wherein said altering means is separate from a focus actuator and is independently controlled.

11. An optical head device as set forth in claim 2, wherein said condensing lens is positionally fixed.

12. An optical head device as set forth in claim 3, wherein said laser is positionally fixed.

* * * * *